United States Patent Office 3,585,067
Patented June 15, 1971

3,585,067
TEXTILE MATERIALS AND A PROCESS FOR FINISHING THE SAME
Wolfgang Klebert, Leverkusen, Karl Schaefer, Opladen, Walter Simmler, Cologne-Mulheim, and Hans Niederpruem, Monheim, Germany, assignors to Farbenfabriken Bayer Aktiengesellschaft, Leverkusen, Germany
No Drawing. Filed May 22, 1967, Ser. No. 640,405
Claims priority, application Germany, May 27, 1966, F 49,311
Int. Cl. B32b *23/08;* B44d *1/22;* D06m *13/00*
U.S. Cl. 117—139.4        7 Claims

ABSTRACT OF THE DISCLOSURE

Textile materials are finished by treatment with an aqueous bath containing vinyl polymers or copolymers and reaction products containing isocyanate groups prepared from polisocyanates and organopolysiloxanes which have at least two active hydrogen atoms as determined by the Zerewitinoff method and a molecular weight of up to about 25,000.

---

This invention relates to textile materials and a process for finishing the same. More particularly it relates to textile materials treated to improve crease and abrasion resistance.

It is an object of this invention to provide improved textile fabrics. It is another object to provide textiles having an improved finish. It is a further object to provide textiles having improved crease and abrasion resistance. It is still another object to provide an improved method of treating textile materials.

The foregoing objects and others which will become apparent from the following description are accomplished in accordance with the invention generally speaking by providing finished textile materials by applying to the textile an aqueous bath containing polymers or copolymers prepared from vinyl or divinyl monomers and reaction products having NCO groups and prepared from polyisocyanates and organopolysiloxanes which contain at least two active hydrogen atoms in the modecule which are reactive with NCO groups and a molecular weight of up to about 25,000.

Any suitable vinyl or divinyl monomers, which are polymerized or copolymerized for use according to the invention may be used, such as, for example, ethylene, propylene, vinyl chloride, vinyl acetate and vinyl ethers, divinyl benzene, styrene, butadiene, isoprene or chloroprene; a,b-unsaturated carboxylic acids such as acrylic acid, methacrylic acid as well as their nitriles, esters and amides and the like. Polymers which contain groups which react with isocyanates are generally preferred. These include, for example, polymers or copolymers prepared from acrylic acid, methacrylic acid, their hydroxyalkyl esters or amides, and copolymers obtained when N-methylolacrylamide, N-ethylolacrylamide, N-methylolmetharcylamide or their derivatives obtained by reaction with alcohols containing at least one further functional group and copolymerized with other olefinically unsaturated compounds, e.g. by the process disclosed in French patent specification No. 1,328,255.

The organic polyisocyanates used in the preparation of the reaction products in accordance with the invention are preferably aliphatic and cycloaliphatic diisocyanates, such as, for example, tetramethylene diisocyanate, hexamethylene diisocyanate, 1,4-cyclohexanediisocyanate, 4,4'-dicyclohexylmethane diisocyanate, 2,4-hexahydrotoluylene diisocyanate, 2,6-hexahydrotoluylene diisocyanate and the like.

In addition to the aliphatic isocyanates any other suitable polyisocyanate may be used, such as aromatic polyisocyanates such as p-phenylene diisocyanate, 2,4-toluylene diisocyanate, 2,6-toluylene diisocyanate, 4,4'-diphenylmethane diisocyanate, 3,3'-dimethyl-4,4'-biphenylene diisocyanate, 1,5-naphthylene diisocyanate, p,p',p''-triphenylmethane triisocyanate and the like. Further, triisocyanates, such as the compound of the formula

OCN—(CH$_2$)$_6$—N[—CONH—(CH$_2$)$_6$—NCO]$_2$ which is obtainable by reaction of 3 mols of hexamethylene diisocyanate, with 1 mol of water may be used.

Any suitable organopolysiloxane having groups reactive with NCO groups may be used in the process of the invention such as those having the general formula

in which $n$ lies between 1 and 3 and in which each substituent R is one of the radicals R'—X—Y or Y—X—Y where R' represents an aliphatic, cycloaliphatic or aromatic hydrocarbon radical which may carry inert substituents, X denotes a bivalent or trivalent aliphatic or araliphatic radical which may contain an ether, thioether, ester or amino linkage and Y stands for a hydroxyl, sulphydryl, carboxyl or carbonamide group or a secondary amino group, provided that at least two siloxane units correspond to the formula

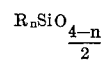

in which R', X and Y have the meaning indicated above and m is one or two, and the substituents R in the remaining siloxane units are exclusively the radical R'.

R may be any suitable radical, such as, for example, methyl, ethylpropyl, isopropyl, tertiary butyl, octadecyl, allyl, chloromethyl, γ-trifluoropropyl, cyclohexyl, phenyl, tolyl and the like. Polysiloxanes corresponding to the given formula where R represents methyl or phenyl are preferably used. Bivalent or trivalent radicals represented by X have, for example, the following structures:

—CH$_2$—, ⁺(CH$_2$)$_3$, —CH$_2$—CH)CH$_3$)—, ⁺(CH$_2$)$_4$,
—CH=CH—CH$_2$—, —CH$_2$—O—CH$_2$—CH$_2$—,
—CH$_2$—O—CH(CH$_3$)—CH$_2$—,
—CH$_2$—S—CH$_2$—CH$_2$—,

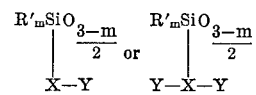

—CH$_2$—O—CO—CH$_2$, —CH$_2$—O—CO—CH(CH$_3$)—,
—CH$_2$—NH—CH$_2$—CH$_2$—,
—CH$_2$—H(CH$_3$)—CH$_2$—CH$_2$— and

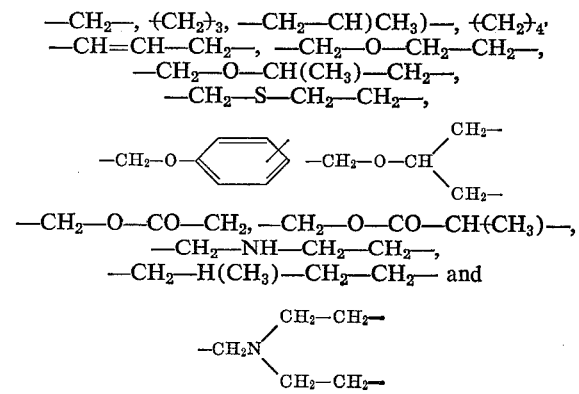

Any suitable polysiloxanes having the formula indicated above may be used such as, for example:

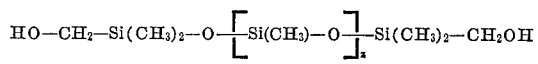

where z is 0 to 130

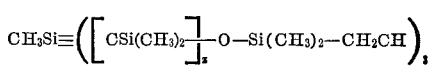

where z is 0 to 45

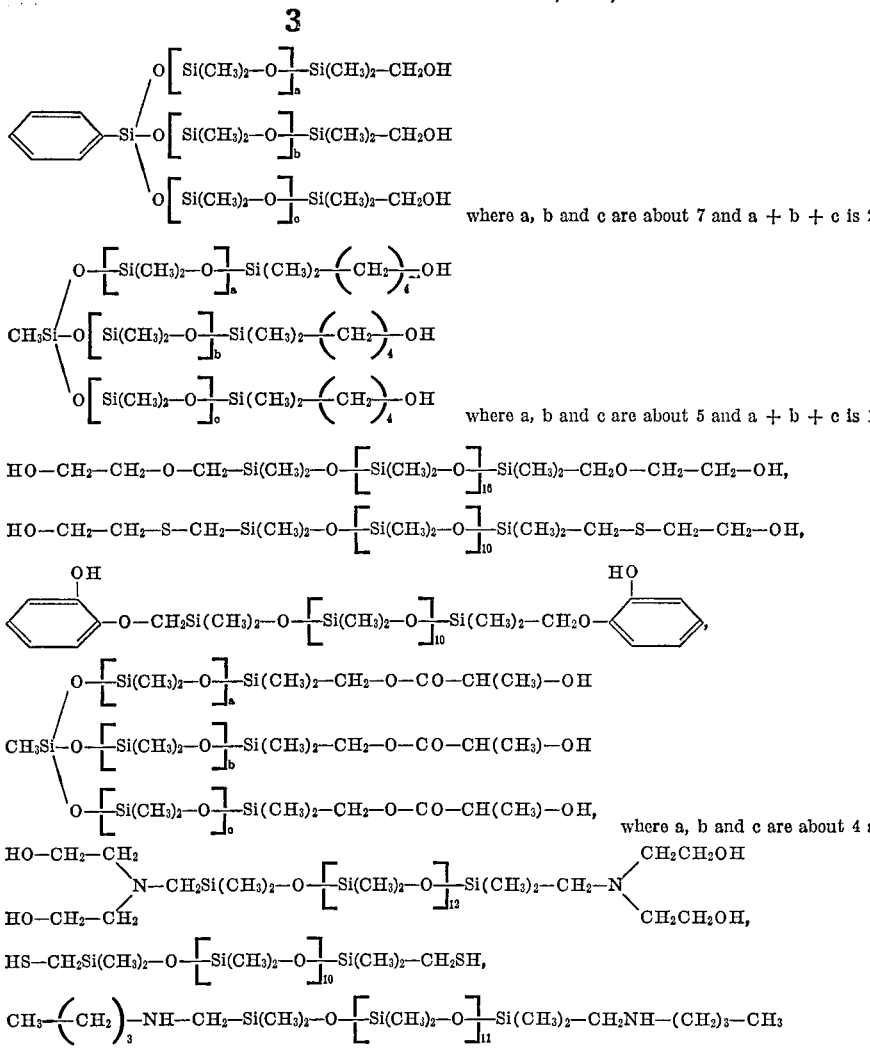

Polysiloxanes of this type are described in German patent specification Nos. 1,193,046, 1,195,953 and 1,199,772, German Auslegeschrift No. 1,196,869, British patent specification Nos. 980,778 and 995,394 and French patent specification Nos. 1,361,115 and 1,365,050.

The reaction products containing free isocyanate groups may be prepared by heating the polyisocyanates with the organopolysiloxanes which contain at least two active hydrogen atoms, preferably at temperatures between about 60 and about 130° C. The components may be used in such a ratio that there are substantially more than two isocyanato groups for each active hydrogen atom. It is then necessary to remove most of the polyisocyanates remaining after complete reaction of the active hydrogen atoms by distillation in vacuo. One may also use the components in such a ratio that there are more than one but not substantially more than two isocyanate groups for each active hydrogen atom, and the reaction mixture may then be heated until its isocyanato group-content corresponds approximately to the value obtained theoretically from complete reaction of the active hydrogen atom. The viscosity of the reaction products obtained by this second method is higher than that for the reaction products obtained by the first method. The isocyanate group-content in the reaction products to be used according to the invention is preferably 2 to 7 percent by weight. The reaction products which carry isocyanate groups may furthermore, be put into the reaction in the form of their bisulphite addition product.

The ratio by weight of the polymers or copolymers to the reaction products containing isocyanato groups is preferably from about 0.25 to about 4:1. The quantities of polymer or copolymers and reaction products containing isocyanato groups used in the aqueous bath may also vary within wide limits, approximately a total of between about 20 and about 300 grams per liter. Suitable proportions can easily be determined according to the required conditions, by preliminary tests.

In order to prepare the impregnating baths, the reaction products containing isocyanato groups, the viscosity of which reaction products is, if necessary adjusted to a low value by the addition of inert, nonhydrophilic solvents such as benzene, toluene, ethyl acetate, benzine or chlorinated hydrocarbons, may first be emulsified in water using a high speed stirrer. Suitable emulsifiers, such as, for example, alkylphenolpolyglycol ethers, or the alkali metal salts of alkyl sulphonates, alkyl benzenesulphonates or of acid sulphuric acid esters of higher aliphatic alcohols, and dissolved in amounts of from about 0.5 to about 10 percent by weight may be used. The polymers or copolymers to be used are then stirred into the emulsion in the form of aqueous dispersions, and the baths are diluted with water if desired.

The textile materials may be treated with the aqueous baths by steeping the textile materials in the baths and then squeezing out, or centrifuging off, the fluid until the weight increase is about 40 to 150 percent, preferably 70 to 100 percent. Alternatively, the textile materials may be sprayed with the aqueous baths and then dried. In many cases it is advisable subsequently to store the treated materials for a few days at room temperature.

It is possible by means of the process according to the invention to obtain excellent finishes on textile materials of natural or synthetic origin. Examples of the textile materials which can be treated are cotton, regenerated cellulose, wool, silk, polyamide, polyurethane, polyester, polycarbonate, polyacrylonitrile and polypropylene fibers. The treatment is particularly beneficial as regards crease-resistance, abrasion-resistance and dimensional stability.

When the process according to the invention is carried out one may also use baths which contain large quantities of additional reaction products containing isocyanato groups. These reaction products are prepared by reacting an excess of organic polyisocyanates with higher molecular weight polyesters, polyester amides, polyethers, polythioethers or the like, which contain at least two hydroxyl groups; such reaction products are described in some detail in e.g. Belgian patent specification No. 660,666. One can in this way enhance the finish obtainable according to the invention.

Furthermore, in the preparation of the impregnating baths one may incorporate as part of the emulsion small quantities of free polyisocyanates.

This may be advantageous as regards the resistance of washing and dry cleaning obtained by the finishing process, especially in cases in which the reaction products of polyisocyanates and organopolysiloxanes have an isocyanate group content of less than 1 percent by weight. An example of a polyisocyanate which may be added is the triisocyanate of the formula $$CH_3-Si\equiv([OSi(CH_3)_2-]_5-O-Si(CH_3)_2-(CH_2OH)_3$$

which is obtainable by reaction of 3 mols of hexamethylene diisocyanate with 1 mol of water and also any of those mentioned above.

The invention will be further illustrated by the following examples in which parts are by weight unless otherwise specified.

EXAMPLE 1

A wool fabric is impregnated by immersion with an aqueous bath containing about 50 parts per 1,000 parts by volume of a 40 percent aqueous dispersion of a copolymer of about 80 parts of butyl acrylate, about 10 parts of styrene and about 10 parts of acrylamide, and about 50 parts of a 50 percent aqueous emulsion, as described below of a reaction product carrying isocyanate groups. The wool fabric is squeezed out to reduce the weight increase to about 80 percent, and is dried at about 110° C. for about 15 minutes and stored at room temperature for about 3 days. The fabric treated in this way showed the following advantages over untreated fabrics:

|  | Shrinkage after 3 machine washings (60° C.), percent | | Appearance of fabric |
|---|---|---|---|
|  | Warp | Weft |  |
| (1) Fabric treated according to the invention | 0.8 | 0.4 | Not felted, open. |
| (2) Untreated fabric | 12.8 | 8.9 | Strongly felted. |

ABRASION RESISTANCE (REPENNING)

Revolutions
(1) Fabric treated according to the invention ------------------ 550
(2) Untreated fabric ------------------------------ 200

The 50 percent aqueous emulsion of the reaction product carrying isocyanate groups is prepared as follows:

About 1,000 parts of an organopolysiloxane of the following formula:

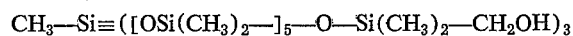

containing about 3.5 percent of hydroxyl groups were mixed with about 1,250 parts of 1,6-hexamethylene di-isocyanate and heated to about 120° C. for about 2 hours. Unreacted diisocyanate is then removed from the reaction mixture at about 160° C. in a thin layer evaporator in a vacuum of about 0.1 mm. Hg. A 50 percent emulsion is then prepared with about 100 parts of ethyl acetate and about 400 parts of water to which is added about 4 parts of a commercial surface active paraffin sulphate from about 500 parts of the resulting reaction product which contained about 5.1 percent of free isocyanate groups.

EXAMPLE 2

Wool yarns are immersed in a bath containing about 60 parts per 1,000 parts by volume of the 40 percent aqueous copolymers dispersion described in Example 1 and about 60 parts of the 50 percent aqueous emulsion described below of a reaction product containing isocyanate groups. The liquid from the bath is then shaken off the yarn to reduce the weight increase to about 50 percent, and then the yarn is dried at about 110° C. for about 20 minutes and stored at room temperature for about 3 days. The yarn treated in this way is pleasant to handle and has the following advantages over untreated yarn:

|  | Shrinkage after 3 washings at 60° C., percent | Appearance |
|---|---|---|
| (1) Yarn treated according to the invention | 0.9 | Not felted. |
| (2) Untreated yarn | 16.8 | Strongly felted. |

The emulsion of reaction product containing isocyanate groups is prepared as follows:

About 1,000 parts of an organopolysiloxane of the following formula:

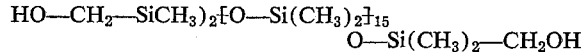

containing 2.7 percent of hydroxyl groups are mixed with about 1,000 parts of hexamethylene-1,6-diisocyanate and heated to about 120° C. for about 2 hours. Excess diisocyanate is then removed at about 160° C. in a thin layer evaporator at 0.1 mm. Hg. A 50 percent aqueous emulsion is then prepared by the method indicated in Example 1 from about 500 parts of the resulting reaction product which contains about 5.7 percent of the free isocyanate groups.

EXAMPLE 3

A polyacrylonitrile fabric is treated with an aqueous bath containing about 20 parts per 1,000 parts by volume of a copolymer of about 80 parts of butyl acrylate, about 10 parts of methylmethacrylate and about 10 parts of acrylamide, and about 20 parts of the 50 percent aqueous emulsion of a reaction product containing isocyanate groups used in Example 1. The liquid is then squeezed out of the fabric to reduce the weight increase to about 70 percent, and the fabric is dried at about 130° C. for about 10 minutes and stored at room temperature for about 3 days. The advantage of this treatment on the fabric treated will be apparent from the following table:

|  | Dry creasing angle | | Wet creasing angle | |
|---|---|---|---|---|
|  | Warp | Weft | Warp | Weft |
| (1) Fabric treated according to the invention | 165 | 168 | 145 | 142 |
| (2) Fabric treated according to the invention after 10 machine washings (60° C.) | 159 | 160 | 140 | 138 |
| (3) Untreated fabric | 112 | 115 | 118 | 121 |

ABRASION RESISTANCE (REPENNING)

|   | Revolutions |
|---|---|
| (1) Fabric treated according to invention | 580 |
| (2) Untreated fabric | 420 |

EXAMPLE 4

A fabric made of fibers prepared from terephthalic acid glycol polyesters is treated as described in the manner described in Example 3. The treated fabric has the following advantages over untreated fabric:

|  | Dry creasing angle | | Wet creasing angle | |
|---|---|---|---|---|
|  | Warp | Weft | Warp | Weft |
| (1) Fabric treated according to the invention | 155 | 160 | 161 | 160 |
| (2) Fabric treated according to the invention after 10 machine washings (60° C.) | 156 | 158 | 157 | 158 |
| (3) Untreated fabric | 135 | 146 | 140 | 148 |

ABRASION RESISTANCE (REPENNING)

|   | Revolutions |
|---|---|
| (1) Fabric according to the invention | 510 |
| (2) Untreated fabric | 430 |

EXAMPLE 5

A fabric made of fibers produced from poly-ε-caprolactam is treated in the manner described in Example 3. The treated fabric has the following advantages over untreated fabric:

|  | Dry creasing angle | | Wet creasing angle | |
|---|---|---|---|---|
|  | Warp | Weft | Warp | Weft |
| (1) Fabric treated according to the invention | 167 | 170 | 146 | 158 |
| (2) Fabric treated according to the invention after 10 machine washings (60° C.) | 160 | 168 | 140 | 152 |
| (3) Untreated fabric | 138 | 142 | 115 | 127 |

ABRASION RESISTANCE (REPENNING)

|   | Revolutions |
|---|---|
| (1) Fabric treated according to the invention | 480 |
| (2) Untreated fabric | 320 |

EXAMPLE 6

A cotton fabric is impregnated with an aqueous liquor containing about 10 parts per 1,000 parts by volume of a 40 percent aqueous dispersion of a copolymer of about 60 parts of butyl acrylate, about 30 parts of styrene and about 10 parts of acrylamide and with about 100 parts of the 50 percent aqueous emulsion of a reaction product carrying isocyanate groups used in Example 2, about 80 parts of dimethylol-dihydroxy ethylene urea and about 12 parts of magnesium chloride.

The cotton fabric is then squeezed out to reduce the weight increase to about 90 percent, and is then dried for about 10 minutes at about 110° C., heated for about 5 minutes at about 150° C. and stored at room temperature for from about 3 to about 4 days. The treated fabric is pleasantly smooth and slightly bulky with the following advantages over untreated fabric:

|  | Dry creasing angle | | Wet creasing angle | |
|---|---|---|---|---|
|  | Warp | Weft | Warp | Weft |
| (1) Fabric treated according to the invention | 139 | 142 | 140 | 143 |
| (2) Fabric treated according to the invention after 5 boiling washes | 135 | 140 | 140 | 141 |
| (3) Untreated fabric | 79 | 81 | 65 | 77 |
| (4) Fabric treated only with dimethyloldihydroxy-ethylene urea in the presence of magnesium chloride | 130 | 133 | 110 | 115 |
| (5) Fabric treated only with dimethyloldihydroxy-ethylene urea in the presence of magnesium chloride after 5 boiling washes | 127 | 130 | 109 | 111 |

ABRASION RESISTANCE (REPENNING)

|   | Revolutions |
|---|---|
| (1) Fabric treating according to the invention | 270 |
| (2) Untreated fabric | 180 |
| (3) Fabric treated only with dimethyloldihydroxyethylene urea in the presence of magnesium chloride | 120 |

EXAMPLE 7

A staple rayon fabric is impregnated with an aqueous liquor containing 150 parts of the 40 percent aqueous copolymer dispersion used in Example 6 and about 160 parts of the 50 percent emulsion of the reaction product carrying isocyanate groups used in Example 2, about 100 parts of dimethylolethylene urea and about 12 parts of magnesium chloride.

The rayon fabric is then squeezed out until the total weight increase is about 100 percent, and is dried at about 110° C. for about 10 minutes, heated to about 150° C. for about 5 minutes and stored at room temperature for from about 3 to about 4 days. The treated rayon fabric, which is pleasantly smooth to handle, has the following advantages over untreated fabric:

|  | Dry creasing angle | | Wet creasing angle | |
|---|---|---|---|---|
|  | Warp | Weft | Warp | Weft |
| (1) Fabric treated according to the invention | 140 | 142 | 141 | 143 |
| (2) Fabric treated according to the invention after 5 boiling washes | 138 | 139 | 140 | 141 |
| (3) Untreated fabric | 110 | 112 | 65 | 70 |
| (4) Fabric treated only with dimethylolethylene urea in the presence of magnesium chloride | 135 | 138 | 95 | 98 |
| (5) Fabric treated only with dimethylolethylene urea in the presence of magnesium chloride after 5 boiling washes | 130 | 132 | 90 | 92 |

ABRASION RESISTANCE (REPENNING)

|   | Revolutions |
|---|---|
| (1) Fabric treated according to the invention | 250 |
| (2) Untreated fabric | 130 |
| (3) Fabric treated only with dimethylolethylene urea in the presence of magnesium chloride | 100 |

EXAMPLE 8

Wool fabrics are impregnated with an aqueous liquor containing 50 parts per 1,000 parts by volume of the 40 percent aqueous copolymer dispersion used in Example 6 and about 25 parts of one of the reaction products carryin isocyanate groups which reaction products are prepared from the organopolysiloxanes and polyisocyanate given in the following table, and the fabric is then squeezed out to reduce the weight increase to 80 percent and is then dried at about 110° C. for about 15 minutes and stored at room temperature for about 3 days. After the treated fabric is machine washed at about 60° C., the surface crimp in warp and weft is in all cases, less than 0.5 percent. The appearance of the fabric is open and not felted.

TABLE

| | Organopolysiloxane | Amount of reactive groups contained in the organopolysiloxane in weight percent | Polyisocyanate | Amount of isocyanate groups in the reaction product in weight percent |
|---|---|---|---|---|
| (1) | $HO-CH_2-Si(CH_3)_2-O-[Si(CH_3)_2O-]_{12}Si(CH_3)_2-CH_2OH$ | 3% OH | Toluylene-2,4-diisocyanate | 5.6 |
| (2) | $HO-CH_2-Si(CH_3)_2-O-[Si(CH_3)_2O-]_{12}Si(CH_3)_2-CH_2OH$ | 3% OH | Hexamethylene-1,6-diisocyanate | 2.2 |
| (3) | $HO-CH_2-Si(CH_3)_2-O-[Si(CH_3)_2O-]_{12}Si(CH_3)_2-CH_2OH$ | 3% OH | Cyclohexylene-1,4-diisocyanate | 5.4 |
| (4) | $HO-CH_2-Si(CH_3)_2-O-[Si(CH_3)_2O-]_{12}Si(CH_3)_2-CH_2OH$ | 3% OH | Dicyclohexylmethane-4,4'-diisocyanate | 5.1 |
| (5) | $HO-CH_2-Si(CH_3)_2-O-[Si(CH_3)_2O-]_{22}Si(CH_3)_2-CH_2OH$ | 1.9% OH | Hexamethylene-1,6-diisocyanate | 3.8 |
| (6) | $HO-CH_2-Si(CH_3)_2-O-[Si(CH_3)_2O-]_{48}Si(CH_3)_2-CH_2OH$ | 0.9% OH | do | 2.1 |
| (7) | $HO-CH_2-CH_2-S-CH_2-Si(CH_3)_2-O-[Si(CH_3)_2-O-]_{10}Si(CH_3)_2-CH_2-S-CH_2-CH_2-OH$ | 3.2% OH | do | 5.8 |
| (8) | $HS-CH_2-Si(CH_3)_2-O-[Si(CH_3)_2-O-]_{10}Si(CH_3)_2-CH_2-SH$ | 6.8% SH | do | 7.6 |
| (9) | $CH_3Si=(IO-Si(CH_3)_2]_5O\ Si(CH_3)_2-(CH_2)_4-OH)_3$ | 3.1% OH | do | 6.6 |
| (10) | $HO-CH_2-CH_2O-CH_2-Si(CH_3)_2-O-[Si(CH_3)_2-O-]_{10}Si(CH_3)_2-CH_2-O-CH_2-CH_2OH$ | 2.3% OH | do | 5.9 |
| (11) | $CH_3Si=\left([O-Si(CH_3)_2-]_4O-Si(CH_3)_2-CH_2O-CO-CH(CH_3)CH\right)_3$ | 3.4% OH | do | 7.4 |
| (12) | $CH_3Si=\left([O-Si(CH_3)_2-]_5O-Si(CH_3)_2-CH_2-O-CH_2-O-CH(CH_3)-CH(CH_3)OH\right)_3$ | 3.0% OH | do | 6.4 |
| (13) | $CH_3Si=\left([O-Si(CH_3)_2-]_5O-Si(CH_3)_2-CH_2-O-CH_2-CH(CH_3)OH\right)_3$ | 3.2% OH | do | 7.4 |
| (14) | $n-C_4H_9NH-CH_2Si(CH_3)_2-O-[Si(CH_3)_2-O-]_{11}Si(CH_3)_2CH_2NH-C_4H_{9}n$ | 2.5% N (sec.) | do | 4.2 |

EXAMPLE 9

Wool fabrics are impregnated in the manner described in Example 8 with an aqueous liquor containing about 50 parts per 1,000 parts by volume of the 40 percent aqueous copolymer dispersion used in Example 6, about 5 parts of one of the reaction products mentioned in the table of Example 8 and about 20 parts of a reaction product containing isocyanate groups, which is prepared from a branched polypropylene glycol of molecular weight 3000 and hexamethylene-1,6-diisocyanate, and contains about 3.6 percent of isocyanate groups. After a machine washing at about 60° C., the appearance of the fabric is unchanged in all cases, and the surface crimp is less than about 0.5 percent. The fabrics treated in this way feel distinctly softer and smoother than fabrics treated under the same conditions with an aqueous liquor containing about 50 parts per 1,000 parts by volume of the 40 percent copolymer dispersion and about 25 parts of the reaction product containing isocyanate groups prepared from polypropylene glycol and hexamethylene-1,6-diisocyanate.

It is to be understood that the examples are for the purpose of illustration and not limitation and that any of the polymers, copolymers, isocyanate or silicones set forth above may be used in place of those specifically set forth therein.

Although the invention has been described in considerable detail for the purpose of illustration, it is to be understood that variations can be made by those skilled in the art without departing from the spirit of the invention and scope of the claims.

What is claimed is:

1. A process for reducing shrinkage and felting of wool textile materials comprising the steps of
   (I) applying to said textile an aqueous composition comprising
       (A) a polymer or copolymer of a monomer selected from the group consisting of ethylene, propylene, vinyl chloride, vinyl acetate, vinyl ethers, styrene, divinyl benzene, butadiene, isoprene, chloroprene, acrylic acid, methacrylic acid, acrylonitrile, methacrylontrile, acrylic acid esters, methacrylic acid esters, acrylamide and methacrylamide; and
       (B) the reaction product of
           (1) an organic polyisocyanate; and
           (2) an organopolysiloxane selected from the group consisting of (a) HO—CH$_2$—Si(CH$_3$)$_2$—O—[Si(CH$_3$)$_2$—O]$_z$—Si(CH$_3$)$_2$—CH$_2$OH wherein $z=0$—130

(b) CH$_3$Si≡([OSi(CH$_3$)$_2$]$_z$—O—Si(CH$_3$)$_2$—CH$_2$OH)$_3$ wherein $z$ is 0—45

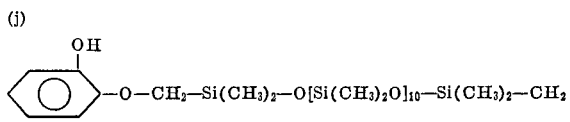

wherein $a+b+c=21$ (d)
CH$_3$Si—O[Si(CH$_3$)$_2$O]$_a$—Si(CH$_3$)$_2$—(CH$_2$)$_4$—OH
O[Si(CH$_3$)$_2$O]$_b$—Si(CH$_3$)$_2$—(CH$_2$)$_4$—OH
O[Si(CH$_3$)$_2$O]$_c$—Si(CH$_3$)$_2$—(CH$_2$)$_4$—OH wherein $a+b+c=15$ (e) CH$_3$Si≡([OSi(CH$_3$)$_2$]$_5$—OSi(CH$_3$)$_2$—CH$_2$O—CH(CH$_3$)—CH(CH$_3$)—OH)$_3$ (f)
CH$_3$—Si—O[Si(CH$_3$)$_2$O]$_a$—Si(CH$_3$)$_2$—CH$_2$—O—CO—CH(CH$_3$)—OH
O[Si(CH$_3$)$_2$O]$_b$—Si(CH$_3$)$_2$—CH$_2$—O—CO—CH(CH$_3$)—OH
O[Si(CH$_3$)$_2$O]$_c$—Si(CH$_3$)$_2$—CH$_2$—O—CO—CH(CH$_3$)—OH wherein $a+b+c=12$ (g) CH$_3$Si≡([OSi(CH$_3$)$_2$]$_5$—OSi(CH$_3$)$_2$—CH$_2$—CH(CH$_3$)—OH)$_3$ (h) HO—CH$_2$CH$_2$—O—CH$_2$—Si(CH$_3$)$_2$—O—[Si(CH$_3$)$_2$—O]$_{16}$—Si(CH$_3$)$_2$—CH$_2$—O—CH$_2$CH$_2$—OH (i) HO—CH$_2$CH$_2$—S—CH$_2$—Si(CH$_3$)$_2$—O[Si(CH$_3$)$_2$—O]$_{10}$—Si—(CH$_3$)$_2$—CH$_2$—S—CH$_2$—CH$_2$—OH (j) 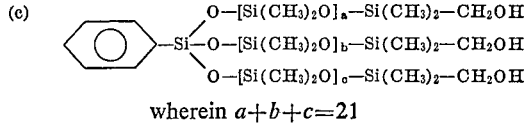

(k) (HO—CH$_2$CH$_2$)$_2$N—CH$_2$—Si—(CH$_3$)$_2$—O—[Si(CH$_3$)$_2$O]$_{12}$—Si(CH$_3$)$_2$—CH$_2$—N(CH$_2$CH$_2$OH)$_2$ (l) HS—CH$_2$Si(CH$_3$)$_2$—O—[Si(CH$_3$)$_2$O]$_{10}$—Si(CH$_3$)$_2$—CH$_2$—SH wherein said reaction product contains 2 percent to 7 percent by weight of isocyanate groups, the weight ratio of (A) to (B) is 0.25:1 to 4:1 and total amount of (A) and (B) in said aqueous composition is 20 to 300 grams per liter;
   (II) removing sufficient solution to provide a weight increase of the said textile material of 40 percent to 150 percent; and
   (III) drying said textile material.

2. The process of claim 1 wherein said organopolysiloxane is selected from the group of these designated (a), (b), (c), (d), (e), (f), (g), (h) and (j).

3. A process for improving abrasion and crease resistance of cotton, regenerated cellulose, silk, polyamide, polyurethane, polyester, polycarbonate, polyacrylonitrile or polypropylene textile materials comprising the steps of
   (I) applying to said textile an aqueous composition comprising
       (A) a polymer or copolymer of a monomer selected from the group consisting of ethylene, propylene, vinyl chloride, vinyl acetate, vinyl ethers, styrene, divinyl benzene, butadiene, isoprene, chloroprene, acrylic acid, methacrylic acid, acrylonitrile, methacrylonitrile, acrylic acid esters, methacrylic acid esters, acrylamide and methacrylamide; and
       (B) the reaction product of
           (1) an organic polyisocyanate; and
           (2) an organopolysiloxane selected from the group consisting of (a) HO—CH$_2$—Si(CH$_3$)$_2$—O—[Si(CH$_3$)$_2$—O]$_z$—Si(CH$_3$)$_2$—CH$_2$OH wherein $z=0$–130

(b) CH$_3$Si≡([OSi(CH$_3$)$_2$]$_z$—O—Si(CH$_3$)$_2$—CH$_2$OH)$_3$ wherein $z$ is 0–45

(c) 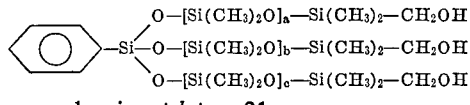

wherein $a+b+c=21$ (d)
CH$_3$Si—O[Si(CH$_3$)$_2$O]$_a$—Si(CH$_3$)$_2$—(CH$_2$)$_4$—OH
O[Si(CH$_3$)$_2$O]$_b$—Si(CH$_3$)$_2$—(CH$_2$)$_4$—OH
O[Si(CH$_3$)$_2$O]$_c$—Si(CH$_3$)$_2$—(CH$_2$)$_4$—OH wherein $a+b+c=15$ (e) CH$_3$Si≡([OSi(CH$_3$)$_2$]$_5$—OSi(CH$_3$)$_2$—CH$_2$O—CH(CH$_3$)—CH(CH$_3$)—OH)$_3$ (f) 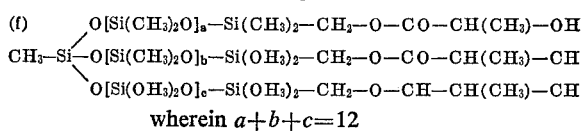

wherein $a+b+c=12$ (g) $CH_3Si\equiv([OSi(CH_3)_2]_5-OSi(CH_3)_2$
    $-CH_2O-CH_2-CH(CH_3)-OH)_3$ (h) $HO-CH_2CH_2-O-CH_2-Si(CH_3)_2-O-[Si(CH_3)_2-O]_{16}-Si(CH_3)_2-CH_2-O-CH_2CH_2-OH$ (i) $HO-CH_2CH_2-S-CH_2$
    $-O[Si(CH_3)_2-O]_{10}-Si(CH_3)_2$
    $-CH_2-S-CH_2-CH_2-OH$ (j) 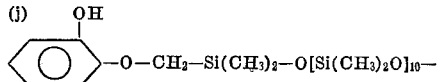
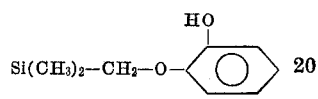

(k) $(HO-CH_2CH_2)_2N-CH_2$
    $-Si(CH_3)_2-O-[Si(CH_3)_2O]_{12}$
    $-Si(CH_3)_2-CH_2-N(CH_2CH_2OH)_2$ (l) $HS-CH_2Si(CH_3)_2-O-[Si(CH_3)_2O]_{10}-Si(CH_3)_2-CH_2-SH$ wherein said reaction product contains 2 percent to 7 percent by weight of isocyanate groups, the weight ratio of (A) to (B) is 0.25:1 to 4:1 and total amount of (A) and (B) in said aqueous composition is 20 to 300 grams per liter;

(II) removing sufficient solution to provide a weight increase of the said textile material of 40 percent to 150 percent; and (III) drying said textile material.

4. The process of claim 3 wherein the textile material is cotton.

5. The process of claim 3 wherein said organopolysiloxane is selected from the group consisting of (a), (b), (c), (d), (e), (f), (g), (h) and (j).

6. The product produced by the process of claim 1.

7. The product produced by the process of claim 3.

References Cited

UNITED STATES PATENTS

| | | | |
|---|---|---|---|
| 2,893,898 | 7/1959 | Evans et al. | 117—161 |
| 2,731,368 | 1/1956 | Fortess et al. | 117—139.4 |
| 2,955,958 | 10/1960 | Brown | 117—143X |
| 3,179,622 | 4/1965 | Haluska | 117—139.5UX |
| 3,265,654 | 8/1966 | Glabisch | 117—139.5X |
| 3,400,173 | 9/1968 | Reischl et al. | 260—824UX |
| 3,419,422 | 12/1968 | Pepe | 117—143X |

MURRAY KATZ, Primary Examiner

H. J. GWINNELL, Assistant Examiner

U.S. Cl. X.R.

117—138.8, 141, 143, 145, 161

UNITED STATES PATENT OFFICE
CERTIFICATE OF CORRECTION

Patent No. 3,585,067　　　　　　　　Dated June 15, 1971

Inventor(s) Wolfgang Klebert, et al.

It is certified that error appears in the above-identified patent and that said Letters Patent are hereby corrected as shown below:

| COLUMN | LINE | ERROR |
|---|---|---|
| 1 | 19 | "polisocyanates" should be ---polyisocyanates--- |
| 1 | 43 | "modecule" should be ---molecule--- |
| 2 | 44 | "CH)CH$_3$)-" should be ---CH(CH$_3$)- --- |
| 2 | 54 | "-H(CH$_3$)-" should be --- -N(CH$_3$)- --- |
| 2 | 69 | "CH)$_3$" should be --- OH)$_3$--- |
| 5 | 27 & 28 | "CH$_3$-Si ([OSi(CH$_3$)$_2$-]5-O-Si(CH$_3$)$_2$-(CH$_2$OH)$_3$" should be ---OCN —(CH$_2$)$_6$— N[-CONH-(CH$_2$)$_6$-NCO]$_2$ --- |
| 6 | 39 | "SiCH$_3$)$_2$" should be ---Si(CH$_3$)$_2$--- |
| 7 | 29 | After "fabric" insert ---treated--- |
| 8 | 66 | "carryin" should be ---carrying--- |
| 9 & 10 | Table (1) | "(CH$_2$)$_3$" should be ---(CH$_3$)$_2$--- |
| 9 & 10 | Table (9) | "Si=([" should be ---Si≡([--- |
| 9 & 10 | Table (11) | "Si=([" should be ---Si≡([--- |

UNITED STATES PATENT OFFICE
CERTIFICATE OF CORRECTION page 2

Patent No. 3,585,067            Dated June 15, 1971

Inventor(s) Wolfgang Klebert, et al.

It is certified that error appears in the above-identified patent and that said Letters Patent are hereby corrected as shown below:

| COLUMN | LINE | ERROR |
|---|---|---|
| 11 | 57 | before "  " insert ---(C)--- |
| 12 | 15 | " 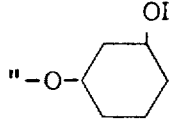 " should be --- 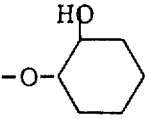 --- |
| 13 | 2 | "(CH$_3$)-CH" should be ---(CH$_3$)-OH--- |
| 13 | 3 | "-O-CH-" should be --- -O-CO- --- |
| 13 | 3 | "(CH$_3$)-CH" should be ---(CH$_3$)-OH--- |
| 13 | 11 | after "S-CH$_2$" insert --- -Si(CH$_3$)$_2$- --- |

Signed and sealed this 28th day of December 1971.

(SEAL)
Attest:

EDWARD M. FLETCHER, JR.
Attesting Officer

ROBERT GOTTSCHALK
Acting Commissioner of Patents